(12) United States Patent
Oh et al.

(10) Patent No.: US 11,150,858 B2
(45) Date of Patent: Oct. 19, 2021

(54) ELECTRONIC DEVICES SHARING IMAGE QUALITY INFORMATION AND CONTROL METHOD THEREOF

(71) Applicant: SAMSUNG ELECTRONICS CO., LTD., Suwon-si (KR)

(72) Inventors: Sanghoon Oh, Suwon-si (KR); Youngkook Kim, Suwon-si (KR); Sangkyun Im, Suwon-si (KR); Seongkoo Cheong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/778,961

(22) Filed: Jan. 31, 2020

(65) Prior Publication Data

US 2020/0249900 A1 Aug. 6, 2020

(30) Foreign Application Priority Data

Jan. 31, 2019 (KR) .................. 10-2019-0012865

(51) Int. Cl.
*G06F 3/14* (2006.01)
*G06T 3/40* (2006.01)

(52) U.S. Cl.
CPC .......... *G06F 3/1446* (2013.01); *G06F 3/1431* (2013.01); *G06T 3/4092* (2013.01); *G09G 2340/04* (2013.01)

(58) Field of Classification Search
CPC ... G06F 3/1431; G06F 3/1446; G06T 3/4092; G06T 3/40; G09G 2340/04;
(Continued)

(56) References Cited

U.S. PATENT DOCUMENTS 9,292,912 B2 3/2016 Lee et al.
9,886,909 B2 2/2018 An et al.
(Continued)

FOREIGN PATENT DOCUMENTS

EP 3337173 A1 6/2018
JP 2015-200806 A 11/2015
(Continued)

OTHER PUBLICATIONS

International Search Report (PCT/ISA/210), issued by International Searching Authority in corresponding International Application No. PCT/KR2020/001269, dated May 19, 2020.
(Continued)

*Primary Examiner* — Richard J Hong
(74) *Attorney, Agent, or Firm* — Sughrue Mion, PLLC

(57) ABSTRACT

An electronic device includes a processor that is configured to, based on receiving a first partial image from among a plurality of partial images obtained by an input device by dividing an image, obtain first image quality information based on the first partial image and transmit the first image quality information to an external electronic device, based on receiving, from the external electronic device, second image quality information obtained from a second partial image among the plurality of the partial images, obtain image quality processing information corresponding to the image based on the first image quality information and the second image quality information, and process the first partial image based on the image quality processing information, and transmit, via the communication interface, the first partial image processed to one of a plurality of display modules included in an external display device.

16 Claims, 10 Drawing Sheets

(58) Field of Classification Search
CPC ........... G09G 3/3426; H04N 21/43615; H04N 21/43635; H04N 21/4516; H04N 21/4858; H04N 5/272; H04N 21/4402
See application file for complete search history.

(56) References Cited

U.S. PATENT DOCUMENTS

| | | | |
|---|---|---|---|
| 10,671,207 B2 | 6/2020 | Park et al. | |
| 2013/0314458 A1* | 11/2013 | Murai | G09G 3/3426 345/691 |
| 2013/0335390 A1* | 12/2013 | Ishibashi | G09F 9/35 345/207 |
| 2014/0119675 A1* | 5/2014 | Kim | G06T 3/40 382/299 |
| 2015/0279037 A1 | 10/2015 | Griffin et al. | |
| 2015/0339967 A1 | 11/2015 | Shin | |
| 2016/0132282 A1 | 5/2016 | Choi et al. | |
| 2016/0335039 A1 | 11/2016 | Cho et al. | |
| 2017/0315772 A1* | 11/2017 | Lee | H04N 21/4402 |
| 2018/0061298 A1 | 3/2018 | Cho et al. | |
| 2018/0129462 A1 | 5/2018 | Han et al. | |
| 2018/0137839 A1 | 5/2018 | Kang et al. | |
| 2018/0181252 A1 | 6/2018 | Park et al. | |
| 2018/0295312 A1 | 10/2018 | Cho et al. | |
| 2018/0357033 A1* | 12/2018 | Welch | H04N 5/272 |
| 2020/0004491 A1* | 1/2020 | Seo | H04N 9/12 |

FOREIGN PATENT DOCUMENTS

| | | |
|---|---|---|
| JP | 2018-087944 A | 6/2018 |
| KR | 10-2014-0061103 A | 5/2014 |
| KR | 10-2016-0097398 A | 8/2016 |
| KR | 10-2016-0133867 A | 11/2016 |
| KR | 10-2017-0041559 A | 4/2017 |
| KR | 10-2018-0077411 A | 7/2018 |

OTHER PUBLICATIONS

Written Opinion (PCT/ISA/237) issued by the International Searching Authority in corresponding International Application No. PCT/KR2020/001269, dated May 19, 2020.
Communication dated May 27, 2020, from the European Patent Office in counterpart European Application No. 20154214.9.
Communication dated Feb. 26, 2021, from the European Patent Office in European Application No. 20154214.9.

* cited by examiner

100

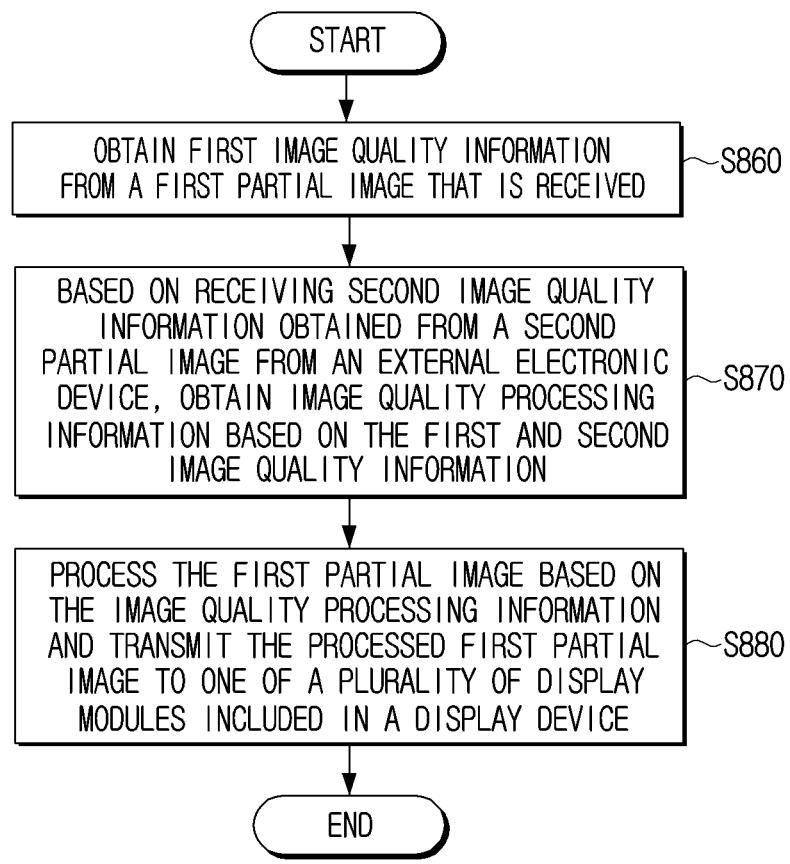

ELECTRONIC DEVICES SHARING IMAGE QUALITY INFORMATION AND CONTROL METHOD THEREOF

CROSS-REFERENCE TO RELATED APPLICATION

This application is based on and claims priority under 35 U.S.C. § 119 to Korean Patent Application No. 10-2019-0012865, filed on Jan. 31, 2019, in the Korean Intellectual Property Office, the disclosure of which is incorporated by reference herein in its entirety.

BACKGROUND

1. Field

The disclosure relates to an electronic device for processing and providing an input image to one of a plurality of display modules and a method for controlling thereof.

2. Description of Related Art

There is a need for an image processing device (e.g., a source box, a control box, a sensing box) that divides and transmits a video signal to transmit a high quality image to a modular display device. In addition, a plurality of image processing devices may be required to transmit a high definition image, such as 8K (7,680×4,320), to the display device.

When a plurality of image processing devices are used, different partial images of an entire image can be input to a separate image processing device. For example, when four modular display devices are implemented as a single large display device, the entire image may be divided into four partial images, and each partial image may be input to a separate image processing device. In this example, since the image quality information of the partial image between the image processing devices is not shared, the image output from the large display apparatus can be output in a state where a partial area has a brightness, or the like, different from other areas. Here, the user may not recognize the image in which four partial images are combined as one image.

SUMMARY

Embodiments of the disclosure address at least the above-mentioned problems and/or disadvantages and provide at least the advantages described below.

According to an example aspect of the disclosure, there is provided a modular display, if images processed by a plurality of image processing devices form one image, in which each image processing device applies the same image quality processing information to a partial image to the input partial image and provide the image to a corresponding modular display.

According to an example embodiment, an electronic device may include a communication interface comprising communication circuitry and a processor configured to control the electronic device to provide a first partial image corresponding to one of a plurality of display modules included in an external display device through the communication interface.

The processor may be configured to, based on receiving the first partial image, transmit first image quality information obtained from the first partial image to an external electronic device, based on receiving, from the external electronic device, second image quality information obtained from a second partial image, obtain image quality processing information based on the first and second image quality information, process the first partial image based on the image quality processing information, and transmit the processed first partial image to one of the plurality of display modules.

The external electronic device may be configured to provide the second partial image to another module among the plurality of display modules.

An electronic system according to an embodiment includes a display device comprising first through fourth display modules, a first electronic device configured to, based on receiving a first partial image, transmit first image quality information obtained from the first partial image to a second, third, and fourth electronic devices, based on receiving second, third, and fourth image quality information obtained from a second, third, and fourth partial images from the second, third, and fourth electronic devices, obtain image quality information based on the first through fourth image quality information, process the first partial image based on the image quality processing information, and transmit the processed first partial image to the first display module, a second electronic device configured to, obtain the image quality processing information based on the first image quality information to the fourth image quality information, process the second partial image based on the obtained image quality processing information, and transmit the processed second partial image to the second display module, a third electronic device configured to, obtain the image quality processing information based on the first image quality information to the fourth image quality information, process the third partial image based on the obtained image quality processing information, and transmit the processed third partial image to the third display module, and a fourth electronic device configured to obtain the image quality processing information based on the first image quality information to the fourth image quality information, process the fourth partial image based on the obtained image quality processing information, and transmit the processed fourth partial image to the fourth display module.

A method for controlling an electronic device according to an embodiment may include, based on receiving a first partial image, transmitting first image quality information obtained from the first partial image to an external electronic device, based on receiving, from the external electronic device, second image quality information obtained from a second partial image, obtaining image quality processing information based on the first and second image quality information, processing the first partial image based on the image quality processing information, and transmitting the processed first partial image to one of the plurality of display modules.

The external electronic device is configured to provide the second partial image to other module among the plurality of display modules.

In an embodiment of the disclosure, an electronic device is provided. The electronic device includes a communication interface including communication circuitry; and a processor configured to, based on receiving a first partial image, transmit first image quality information obtained from the first partial image to an external electronic device. The processor is further configured to, based on receiving, from the external electronic device, second image quality information obtained from a second partial image, obtain image quality processing information based on the first image quality information and the second image quality information. The processor is further configured to process the first partial image based on the image quality processing information, and transmit, via the communication interface, the first partial image processed to one of a plurality of display modules included in an external display device, wherein the external electronic device is configured to provide the second partial image to another module among the plurality of display modules.

In an embodiment of the disclosure, an electronic system is provided. The electronic system includes a display device including a first display module, a second display module, a third display module, and a fourth display module.

The electronic system further includes a first electronic device configured to: based on receiving a first partial image, transmit first image quality information obtained from the first partial image to a second electronic device, a third electronic device, and a fourth electronic device, based on receiving second image quality information obtained from a second partial image from the second electronic device, receiving third image quality information obtained from a third partial image from the third electronic device, and receiving fourth image quality information obtained from a fourth partial image from the fourth electronic device, obtain image quality processing information based on the first through fourth image quality information, and process the first partial image based on the image quality processing information, and transmit the first partial image that is processed to the first display module.

The electronic system further includes a second electronic device configured to obtain the image quality processing information based on the first through fourth image quality information, process the second partial image based on the image quality processing information obtained, and transmit the second partial image that is processed to the second display module.

The electronic system further includes a third electronic device configured to obtain the image quality processing information based on the first through fourth image quality information, process the third partial image based on the image quality processing information obtained, and transmit the third partial image that is processed to the third display module.

The electronic system further includes a fourth electronic device configured to obtain the image quality processing information based on the first through fourth image quality information, process the fourth partial image based on the image quality processing information obtained, and transmit the fourth partial image that is processed to the fourth display module.

In an embodiment of the disclosure, a method for controlling a system including an electronic device is provided. The method comprises: based on receiving a first partial image, transmitting first image quality information obtained from the first partial image to an external electronic device; based on receiving, from the external electronic device, second image quality information obtained from a second partial image, obtaining image quality processing information based on the first image quality information and the second image quality information; and processing the first partial image based on the image quality processing information, and transmitting the first partial image processed to one of a plurality of display modules of a display device. The external electronic device is configured to provide the second partial image to another module among the plurality of display modules of the display device.

According to various embodiments as described above, if the same image quality processing information is applied to a plurality of image processing devices and partial images transmitted from each image processing device are output from a display device, there is an effect as if the images are output through one image processing device.

BRIEF DESCRIPTION OF THE DRAWINGS

The above and/or other aspects, features, and advantages of certain embodiments of the present disclosure will be more apparent from the following detailed description, taken in conjunction with the accompanying drawings, in which:

FIG. 9 is a flow chart illustrating another controlling method of an electronic device according to an embodiment.

DETAILED DESCRIPTION

Figure 1A:
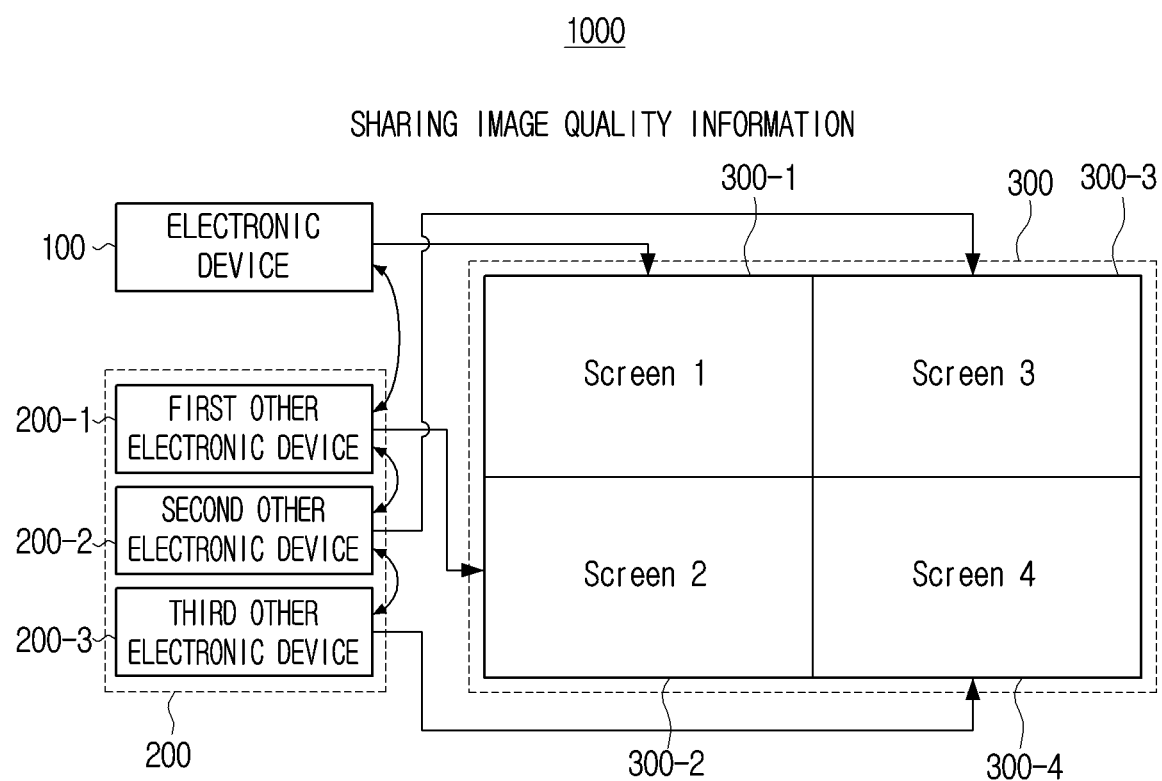
FIG. 1A is a diagram illustrating an electronic system according to an embodiment of the disclosure.

The disclosure will be described in greater detail with reference to the attached drawings.

After terms used in the present specification are briefly described, the disclosure will be described in detail.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by the applicant. Unless there is a specific definition of a term, the term may be construed based on the overall contents and technological common sense of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

Expressions such as "at least one of A and/or B" and "at least one of A and B" should be understood to represent "A," "B" or "A and B."

As used herein, the terms "first," "second," or the like may identify corresponding components, regardless of importance of order, and are used to distinguish a component from another without limiting the components.

In addition, a description that one element (e.g., a first element) is "(operatively or communicatively) coupled with/to" or "connected to" another element (e.g., a second element) should be interpreted to include both the case that the one element is directly coupled to the other element, and the case that the one element is coupled to the another element through still another element (e.g., a third element).

A term such as "module," "unit," "part," and so on is used to refer to an element that performs at least one function or operation, and such element may be implemented as hardware or software, or a combination of hardware and software. Further, other than when each of a plurality of "modules," "units," "parts," and the like must be realized in an individual hardware, the components may be integrated in at least one module or chip and be realized in at least one processor (not shown). In the following description, a term "user" may refer to a person using an electronic device, or a device (for example, an artificial intelligence electronic device) using an electronic device.

Hereinafter, non-limiting example embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

Hereinafter, non-limiting example embodiments will be described in detail with reference to the accompanying drawings.

Figure 1B:
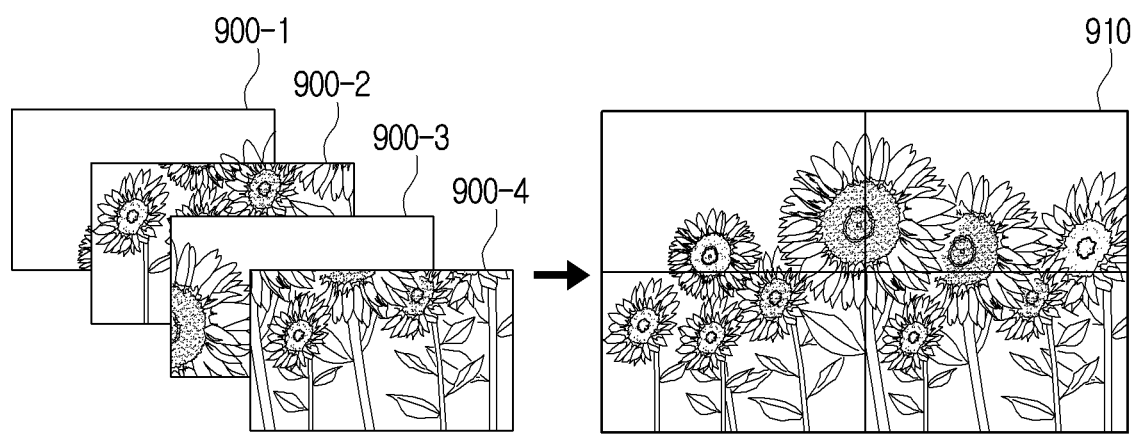
FIG. 1B is a diagram illustrating an example of partial images that may be combined by the electronic system of FIG. 1A to form one image frame.

FIG. 1A is a diagram illustrating an electronic system according to an embodiment of the disclosure. FIG. 1B is a diagram illustrating an example of partial images that may be combined by the electronic system to form one image frame.

An electronic system 1000 includes an electronic device 100, an other electronic device 200, and a display device 300.

The electronic device 100 is an image processing device that processes an input image and transmits the processed image to one of a plurality of display modules included in the display device 300. Specifically, the electronic device 100 is a device for decomposing and transmitting a video signal of an input image in order to transmit a high-quality image. When the video signal is decomposed and transmitted, a high quality image can be transmitted even though the size of the channel bandwidth of the electronic device 100 is relatively small. The electronic device 100 may be implemented in a variety of forms, such as a source box, a control box, a sending box, or the like, that may decompose and transmit the input video signal to a display device.

The other electronic device 200 is a device that may be a same type as the electronic device 100, and is an image processing device for processing an input image and transmitting the input image to another module(s) among the plurality of display modules included in the display device 300.

The display device 300 includes a plurality of display modules. For example as shown in FIG. 1A, first through fourth display modules (300-1 through 300-4), which may be respective screens 1 through 4, may be combined to implement a single display device 300. The display device 300 may be implemented in a bezel-less form and may display seamless images without disconnection between display modules in displaying images.

In order to implement the display device 300 as a high quality modular display device, such as 8K (7,680×4,320), a plurality of image processing devices may be required. Accordingly, there is a need for the other electronic device 200 as well as the electronic device 100 to transmit a high quality image to the modular display device 300. As shown in FIG. 1A, there are separate image processing devices corresponding to each of the display modules 300-1 through 300-4. For example, electronic device 100 and the other electronic device 200 may be separate image processing devices, wherein the other electronic device 200 may include a first other electronic device 200-1, a second other electronic device 200-2, and a third other electronic device 200-3 as image processing devices. Here, 8K (7,680×4,320) is an example of resolution, and is not limited thereto. Each image processing device may process different partial images and transmit the images to a corresponding display module. For example, with reference to FIGS. 1A-B, the electronic device 100 may provide a first partial image 900-1 to the first display module 300-1, the first other electronic device 200-1 may provide a second partial image 900-2 to the second display module 300-2, the second other electronic device 200-2 may provide a third partial image 900-3 to the third display module 300-3, and the third other electronic device 200-3 may provide a fourth partial image 900-4 to the fourth display module 300-4. The first partial image through the fourth partial image (900-1 through 900-4) may be combined to form one frame 910. That is, the display device 300 outputs the received first through fourth partial images (900-1 through 900-4) together in the corresponding display modules (300-1 through 300-4), and the user may recognize that one image is output.

In an example where image quality information on each partial image is not shared between image processing devices, a part of an image output from the display device 300 may have a different brightness than other parts and thus the image may not be recognized as a single screen.

Hereinbelow, various embodiments of sharing image quality information between image processing devices and applying the same image quality processing information will be described.

Figure 2:
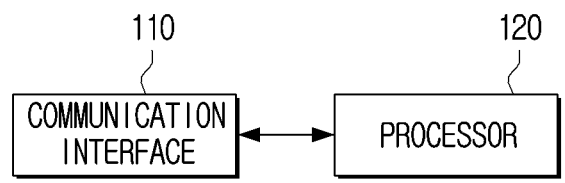
FIG. 2 is a block diagram illustrating an operation of an electronic device according to an embodiment.

FIG. 2 is a block diagram illustrating an operation of an electronic device according to an embodiment.

Referring to FIG. 2, the electronic device 100 includes a communication interface 110 and a processor 120.

The communication interface 110 may include circuitry that is configured to transmit and receive information to and from the electronic device 200, which may be an external electronic device from the electronic device 100, and the display device 300. Specifically, the communication interface 110 may transmit and receive image quality information to and from the electronic device 200, and transmit, to the display device 300, the video signal to which the image quality processing information is applied. Here, the electronic device 200 may have its configuration illustrated in FIG. 1.

The communication interface 110 may transmit and receive image quality information to and from the electronic device 200 through a wired communication method via a cable. For example, the communication interface 110 may use communication methods such as universal asynchronous receiver/transmitter (UART), serial peripheral interface (SPI), and inter integrated circuit (I2C).

The communication interface 110 may transmit and receive image quality information to and from the electronic device 200 by a wireless communication method. For example, the communication interface 110 may use a communication method such as a BlueTooth (BT), wireless fidelity (WI-FI), Zigbee, infrared (IR), Ethernet, serial interface, universal serial bus (USB), mobile industry processor interface camera serial interface (MIPI CSI), near field communication (NFC), vehicle to everything (V2X), cellular, or the like.

Meanwhile, the communication interface 110 may be connected to the display device 300 through a port. Specifically, the communication interface 110 may be connected to the display device 300 via a cable connected to the port. Here, the cable may be a high definition multimedia interface (HDMI) cable.

The above described embodiment is a non-limiting example embodiment, and the cable may alternatively be a digital visual interface (DVI) cable, low voltage differential signals (LVDS) cable, an optical cable, or the like.

The communication interface 110 may transmit a video signal to the display device 300 by a wireless communication method.

The communication interface 110 may receive a partial image from an input device (not shown) based on the wired/wireless communication method described above. Here, the input device is configured to decompose the entire image and transmit the decomposed partial image to the electronic device 100 and the electronic device 200, and may be implemented as a videowall processor, a multi video output PC, a matrix switcher, or the like.

The processor 120 controls an overall operation of the electronic device 100.

According to an embodiment, the processor 120 may be implemented with a digital signal processor (DSP), a microprocessor, and a timing controller (TCON) which process a digital video signal, but this is not limited thereto. The processor 120 may include one or more among a central processing unit (CPU), a micro controller unit (MCU), a micro processing unit (MPU), a controller, an application processor (AP), a communication processor (CP), an advanced reduced instruction set computing (RISC) machine (ARM) processor, an artificial intelligence (AI) processor or may be defined as a corresponding term. The processor 120 may be implemented with system on chip (SoC) type or a large scale integration (LSI) type which a processing algorithm is built therein or in a field programmable gate array (FPGA) type. The processor 120 may perform various functions by executing computer executable instructions stored in a memory (not shown). The memory may be included in the electronic device 100.

The processor 120 may provide a first partial image, corresponding to one of the plurality of display modules included in the display device 300, to the one display module via the communication interface 110. Here, each of the plurality of display modules may be divided into a respective plurality of groups. Each group of the plurality of groups may include one or more display sub-modules. Further, the processor 120 may decompose a video signal for a first partial image (e.g. first partial image 900-1) corresponding to one of the plurality of display modules and transmit each of the decomposed video signals to a corresponding group into which the one of the plurality display modules is divided. This will be described in detail with reference to FIGS. 6 and 7.

Hereinbelow, an embodiment of sharing image quality information of each partial image between a plurality of image processing devices (e.g. the electronic device 100 and the electronic device 200) will be described.

When the first partial image 900-1 is received from the input device, the processor 120 may analyze the first partial image and obtain first image quality information corresponding to the first partial image 900-1. The processor 120 may transmit the acquired first image quality information to the electronic device 200, which may be an external electronic device. The image quality information may be at least one of luminance information, pixel value information, contrast ratio information, or resolution information. The luminance information may include a luminance distribution, an average value of luminance, a maximum value, a minimum value, or the like. The pixel value information may include red-green-blue (RGB) histogram information or the like.

The input device is a device for decomposing the entire image and transmitting the decomposed partial image to the electronic device 100 and the electronic device 200, which may be external to the electronic device 100, and the input device may be implemented as a videowall processor, a multi video output Pc. A matrix switcher, or the like. Accordingly, if the second partial image is received from the input device, the electronic device 200 may obtain second image quality information corresponding to the second partial image and transmit the second image quality information to the electronic device 100.

The electronic device 200 provides the second partial image to one of the plurality of display modules.

Each of the first partial image and the second partial image is an image in which the entire image is decomposed, and can be a part of an image frame displayed on the external display device 300. That is, the first partial image and the second partial image transmitted from each of the electronic device 100 and the external electronic device 200 may be images forming one frame.

The processor 120, upon receiving the second image quality information obtained from the second partial image from the electronic device 200, may obtain image quality processing information based on the first and second image quality information.

The image quality processing information is information to be applied to each partial image and may include at least one of luminance information, pixel value information, contrast ratio information, or resolution information.

The processor 120 may obtain image quality processing information based on at least one of a maximum value, a minimum value, or an average value of the first image quality information and the second image quality information. For example, the first partial image may include the Sun and the overall luminance of the first partial image is relatively high relative to the second partial image. However, in the case of an original image before the first partial image and the second partial image are decomposed, the luminance difference between the region corresponding to the first partial image and the region corresponding to the second partial image is not large, but when the image is decomposed into the first partial image and the second partial image, the luminance difference can be generated as described above. In this example, the processor 120 may calculate the average value of the luminance of the first partial image and the luminance of the second partial image as image quality processing information.

Alternatively, the processor 120 may obtain image quality processing information based on the meta data of the first partial image and the second partial image, apply the obtained image quality processing information to the first partial image, and transmit the same to the display device 300. That is, the processor 120 may perform image quality processing of the first partial image on the basis of the meta data and transmit the image to the display device 300. Here, the meta data may be data of the entire image in which the first partial image and the second partial image are combined. That is, the processor 120 may obtain the image quality processing information of the first partial image based on the meta data of the entire image. Also, the electronic device 200 may obtain the image quality processing information of the second partial image based on the meta data of the entire image.

The image quality processing information may be obtained based on various information such as RGB histogram of the first image quality information and the second image quality information, contour processing luminance and/or pixel distribution, a luminance value at a specific area, or the like, in addition to the aforementioned condition.

Image quality processing information may be determined as a predetermined value based on a content type of an image. For example, when the image content is a movie, the image quality processing information may be determined to a value corresponding to a cinema mode, and when an image content is a sport, a value corresponding to a sports mode may be determined. In this case, the first image quality information and the second image quality information may be considered.

The image quality processing information may also be determined according to the ambient illumination of the display device 300. For example, if the display device 300 is disposed outdoors, and the ambient illumination is relatively high by the direct light, the first partial image may be applied with the image quality processing information so that the first partial image may have a relatively high luminance, and if the display device 300 is disposed in a dark room and the ambient illumination is relatively low, the first partial image may be applied with image quality processing information so that the first partial image may have a relatively low luminance. In this example, the first image quality information and the second image quality information may be considered.

The processor 120 may obtain image quality processing information based on predetermined reference information. Here, the predetermined reference information refers to information that is a criterion for obtaining image quality processing information. For example, if the electronic device 100 obtains the average value of the first image quality information and the second image quality information as image quality processing information, the reference information may be an average value of the first image quality information and the second image quality information. This reference information may be set by the user, and the electronic device 100 and the electronic device 200 may use the same reference information.

The processor 120 may process the first partial image based on the image quality processing information and transmit the processed first partial image to one of the plurality of display modules included in the external display device 300. For example, the processor 120 may apply an average value of the luminance of the first partial image and the luminance of the second partial image to the first partial image as image quality processing information, and transmit the first partial image to which the average luminance value is applied to one of the plurality of display modules. For example, if the electronic device 100 is a device corresponding to the first display module, the first partial image to which the average luminance value is applied may be transmitted to the first display module.

Each of the first partial image and the second partial image may be processed by the electronic device 100 and the electronic device 200 based on the image quality processing information and then provided to the display device 300.

The embodiment is not limited thereto and the first partial image and the second partial image may be processed based on image quality processing information in the display device 300. Specifically, the processor 120 may obtain image quality processing information based on the first image quality information and the second image quality information and transmit the first partial image and the obtained image quality processing information to one of the plurality of display modules. The electronic device 200 may also obtain image quality processing information based on the first image quality information and the second image quality information and transmit the second partial image and the obtained image quality processing information to another one of the plurality of display modules.

The display device 300 may display the received image quality processing information by applying the received image quality processing information to the received first partial image and the second partial image. Since the image quality processing information obtained by the electronic device 100 and the electronic device 200 is the same, the image quality processing information may be transmitted only by one of the electronic device 100 and the electronic device 200 to the display device 300. For example, the electronic device 100 may transmit the image quality processing information.

After receiving a current image frame included in the first partial image, the processor 120 may process the current image frame based on the image quality processing information before a next image frame is received, and transmit the processed current image frame to one of the plurality of display modules. That is, the processor 120 may receive a partial image from the input device on a frame unit, share image quality information with the electronic device 200 before the image of the next frame is received and obtain image quality processing information, and transmit, to the display device 300, the partial image to which the image quality processing information is applied.

In other words, the processor 120 may obtain the image quality processing information on a frame unit and has to finish a work related to the current frame image before the partial image of the next frame is input.

According to one embodiment, the electronic device 100 and the electronic device 200 may obtain image quality processing information based on the received image quality information obtained as described above. The electronic device 100 and the electronic device 200 may be connected to each other via a bus structure. When there are a plurality of external electronic devices (e.g. two or more electronic devices 200) or a plurality of devices (e.g. other electronic devices 200-1, 200-2, 200-3, etc.) that correspond to a single external electronic device (e.g. electronic device 200), the first image quality information transmitted by the electronic device 100 may be transmitted to each of the plurality of electronic devices 200 (or each of the plurality of other electronic devices of the electronic device 200), and the electronic device 100 may receive image quality information from each of the plurality of electronic devices 200 (or each of the plurality of other electronic devices of the single electronic device 200). Each of the electronic device 100 and the electronic device 200 may obtain image quality information of the combined entire image forming one frame.

The electronic device 100 and the electronic device 200 may obtain image quality information in accordance with predetermined reference information. The predetermined reference information refers to information in which criterion for obtaining image quality information is established based on at least one of a maximum value, a minimum value, or an average value of the first image quality information and the second image quality information. For example, when the reference information is set to an average value, the processor 120 may obtain the image quality processing information as an average value of the first image quality information and the second image quality information. The electronic device 100 and the electronic device 200 may use the same reference information. That is, the predetermined reference information may be information used for obtaining image quality processing information based on the first and second image quality information by the electronic device 200.

For example, when the reference information is set to an average value, the electronic device 200 may also obtain the image quality processing information as an average value of the first image quality information and the second image quality information. Therefore, the image quality processing information obtained by the electronic device 100 is the same as the image quality processing information obtained by the electronic device 200.

The image output from the plurality of display modules may be applied with the same image quality processing information.

The predetermined reference information may be input by the user and reference information input through the bus structure may be shared. The predetermined reference information may be automatically determined based on a type of an image.

According to another embodiment, one of the electronic device 100 and the external electronic device 200 is a master device, and the rest may be a slave device(s).

As a non-limiting example, the electronic device 100 may be a master device. In this example, the image quality processing information may be obtained only by the electronic device 100, and the processor 120 may control the communication interface 110 to transmit the obtained image quality processing information to the electronic device 200. The processor 120, when receiving the first partial image from an input device, may obtain first image quality information from the first partial image that is inputted. The electronic device 200 may obtain the second image quality information from the second partial image that is inputted and transmit the same to the electronic device 100. When receiving the second image quality information from the electronic device 200, the processor 120 may obtain the image quality processing information based on the first image quality information and the second image quality information. The processor 120 may transmit the obtained image quality processing information to the electronic device 200. That is, the electronic device 100 which corresponds to a master device may not transmit the first image quality information to the electronic device 200 and the electronic device 200 may not calculate the image quality processing information either.

The electronic device 100 corresponding to the master device may receive image quality information of each image forming the entire image and obtain one image quality processing information therefrom. The electronic device 100 may transmit the obtained image quality processing information, corresponding to the plurality of display modules, to the electronic device 200. Therefore, the image output from a plurality of display modules may be an image to which the same image quality processing information is applied.

In anon-limiting example embodiment, the electronic device 100 may be a slave device. The image quality processing information may be obtained only by the electronic device 200 which is a master device, and the electronic device 100 may receive image quality processing information from the electronic device 200. When receiving the first partial image from the input device, the processor 120 may obtain the first image quality information from the first partial image and transmit the obtained first image quality information to the electronic device 200. When the image processing information is received by the electronic device 100, the processor 120 may process the first partial image based on the image quality processing information and transmit the processed first partial image to one of the corresponding plurality of display modules. The electronic device 200 corresponding to the master device may also apply the image quality processing information obtained by the electronic device 200 to the second partial image and transmit the same to the other of the plurality of display modules. Therefore, the image output from the plurality of display modules may be the image to which the same image quality processing information is applied.

The first partial image and the second partial image may be provided to each of the electronic device 100 and the electronic device 200 from an image providing device storing an image content including the first partial image and the second partial image. The image providing apparatus may be an input device described above.

The electronic device 200 is described to be a single device, but may be implemented as a plurality of external electronic devices. For example, when the display device 300 includes four display modules, the electronic device 200 may be three.

It has been described that the electronic device 100 is a device separate from the display device 300, but the electronic device 100 may be included in the display device 300 and implemented as a single device.

The electronic device 100 and the at least one electronic device 200 may be included in a single device, and the device including the electronic device 100 and the at least one electronic device 200 may be provided in the display device 300.

Figure 3:
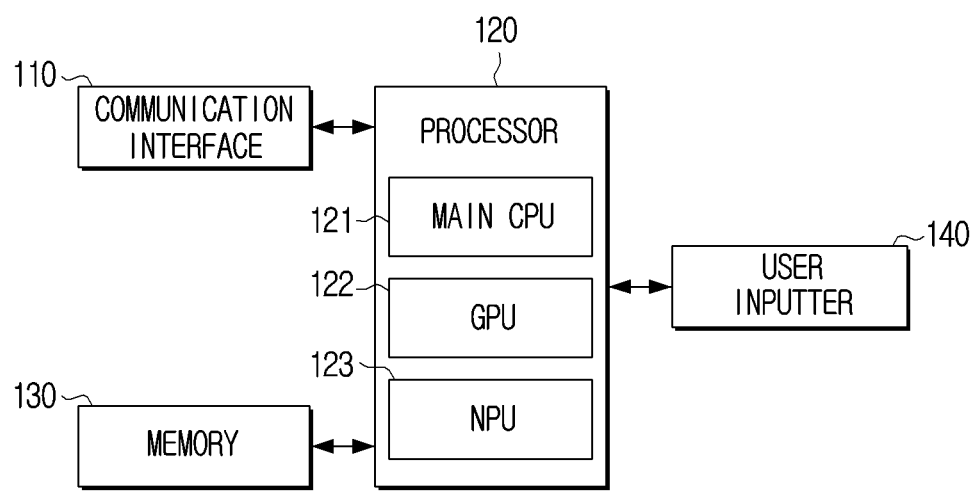
FIG. 3 is a block diagram illustrating a specific configuration of an electronic device.

FIG. 3 is a block diagram illustrating a specific configuration of the electronic device 100.

Referring to FIG. 3, the electronic device 100 includes the communication interface 110, the processor 120, a memory 130, and a user inputter 140. A part of the configuration of FIG. 3 overlapping with the configuration of FIG. 2 will not be further described.

The communication interface 110 may include a Wi-Fi module, a Bluetooth module, local area network (LAN) module, wireless communication module, or the like. Here, each communication module may be implemented with at least one hardware chip format. The wireless communication module may include at least one communication chip performing communication according to various communication standards, such as Zigbee, $3^{rd}$, Ethernet, universal serial bus (USB), mobile industry processor interface camera serial interface (MIPI CSI), third generation (3G), $3^{rd}$ generation partnership project (3GPP), long term evolution (LTE), LTE advanced (LTE-A), $4^{th}$ generation (4G), $5^{th}$ generation (5G), or the like, in addition to the communication modes described above. These are merely examples, and the communication interface 110 may use at least one communication module among various communication modules.

The processor 120 may control overall operations of the electronic device 100 using various programs stored in the memory 130. The processor 120 may include a graphic processing unit (GPU) 122 for graphic processing corresponding to the image. The processor 120 may be implemented as a system on chip (SoC) including a core and the graphics processing unit 122. The processor 120 may include a single core, dual cores, triple cores, quad cores, and multiple cores.

The processor 120 may transmit a partial image input from an input device to the display device 200 through the communication interface 110. Specifically, the processor 120 may apply the input image quality processing information and obtain a video signal to be provided to one of the plurality of display modules, and provide the obtained video signal to one controller (not shown) among the corresponding plurality of display modules.

The processor 120 may include a main CPU 121, GPU 122, and a neural processing unit (NPU) 133.

The main CPU 121 may access the memory 130 and perform booting using O/S stored in the memory 130. The main CPU 121 performs various operations using various programs and contents data, or the like, stored in the memory 130. According to an embodiment, the main CPU 121 may copy a program stored in the memory 130 to random access memory (RAM) according to an instruction stored in read-only memory (ROM), access the RAM, and execute a corresponding program.

The GPU 122 may correspond to a high performance processing device for graphics processing, and may be a specialized electronic circuit designed to accelerate image generation in a frame buffer to quickly process and change a memory and output the processed result to a screen. In addition, the GPU 122 may mean a visual processing unit (VPU).

The NPU 123 may be an AI chipset (or AI processor) and may be an AI accelerator. The NPU 123, may be made by, for example, Intel and may correspond to a processor chip that has been optimized for deep neural network performance. The NPU 123 may correspond to a processing device executing a deep learning model on behalf of the GPU 122, and the NPU 123 may correspond to a processing device executing a deep learning model with the GPU 122.

The memory 130 may store the first partial image received from the input device. The memory 130 may store first image quality information obtained from the first partial image and store image quality processing information obtained based on the first image quality information and the second image quality information.

The memory 130 may be implemented as a memory separate from the processor 120. The memory 130 may be implemented as a memory embedded in the electronic device 100, and/or may be implemented as a detachable memory in the electronic device 100, according to the purpose of data usage. For example, data for driving the electronic device 100 may be stored in a memory embedded in the electronic device 100, and data for an additional function of the electronic device 100 may be stored in the memory detachable to the electronic device 100. A memory embedded in the electronic device 100 may be a volatile memory, such as a dynamic random access memory (DRAM), a static random access memory (SRAM), a synchronous dynamic random access memory (SDRAM), or a nonvolatile memory, such as one-time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). In the case of a memory detachably mounted to the electronic device 100, the memory may be implemented as a memory card (for example, a compact flash (CF), secure digital (SD), micro secure digital (micro-SD), mini secure digital (mini-SD), extreme digital (xD), multi-media card (MMC), and etc.), an external memory (for example, a USB memory) connectable to the USB port, or the like.

The memory 130 may be implemented as an internal memory such as ROM (for example, electrically erasable programmable read-only memory (EEPROM)) and RAM included in the processor 120.

The user inputter 140 is configured to receive various user commands and information. The processor 120 may execute a function corresponding to a user command input through the user inputter 140, or store information input through the user inputter 140 in the memory 130.

For example, the processor 120 may receive the image quality information from the user through the user inputter 140 and store the same in the memory 130.

The user inputter 140 may include a microphone (not shown) for receiving a user command in a voice format or may be implemented as a display (touch screen) for receiving a user input by touch.

The display may be implemented as a touch screen type forming a mutual layer structure with a touch pad. The touch screen may be configured to detect a touch input pressure as well as a touch input position.

The user inputter 140 may receive a user command or a signal including information on a job from a separate control device (not shown) for controlling the electronic device 100.

Figure 4:
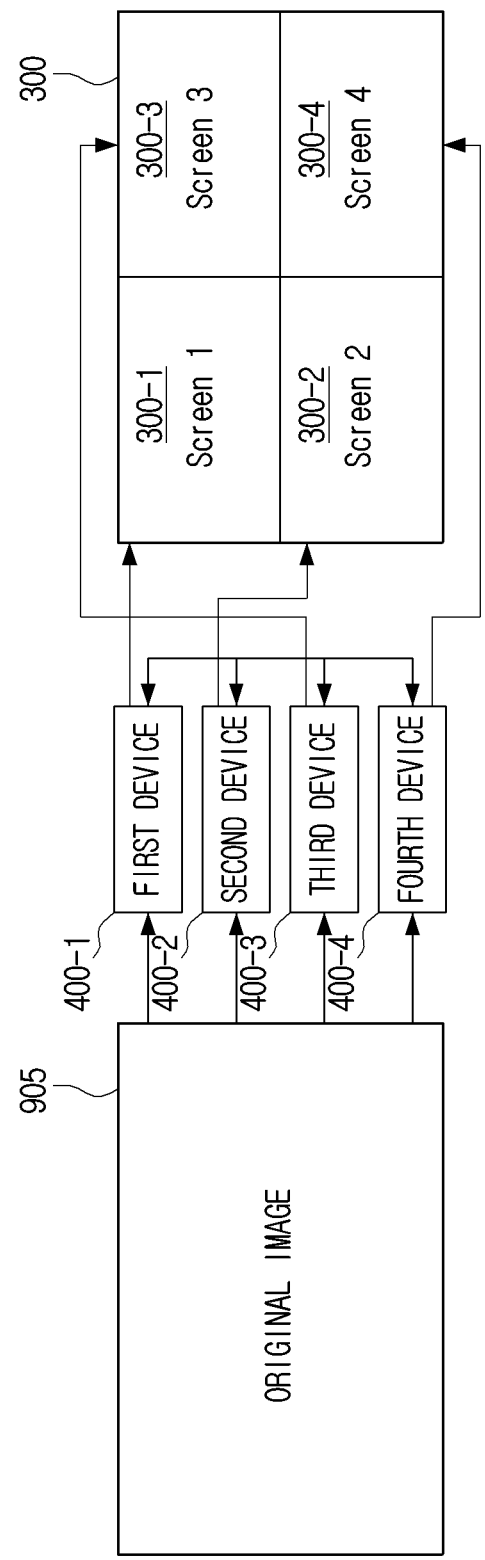
FIG. 4 is a view illustrating an operation of sharing image quality information between devices according to an embodiment.

FIG. 4 is a view illustrating an operation of sharing image quality information between devices according to an embodiment.

As illustrated in FIG. 4, the display device 300, in an embodiment, may be implemented as a device in which the first through fourth display modules 300-1 to 300-4 are combined, and specifically, the first and second display modules 300-1 and 300-2 are disposed in the first column and the third and fourth display modules 300-3 and 300-4 are disposed in the second column.

As a non-limiting example, the first through fourth devices (400-1 through 400-4) may be respective image processing devices that each corresponds to a respective one of the first through fourth display modules (300-1 through 300-4), and the image processing devices each transmit a partial image to a corresponding one of the display modules.

An original image 905 corresponding to one frame may be decomposed by an input device so that each of the first through fourth partial images may be transmitted to the first through fourth devices (400-1 through 400-4). The first device 400-1 may obtain first image quality information corresponding to the first partial image when the first partial image is received, and transmit the first image quality information to the second through fourth devices (400-2 through 400-3). The second device 400-2 may obtain second image quality information corresponding to the second partial image when the second partial image is received, and transmit the second image quality information to the first, third, and fourth devices (400-1, 400-3, and 400-4). The same operation is performed with the third device 400-3 and the fourth device 400-4.

In this example, the first device 400-1 may have image quality information corresponding to each of the first partial image through the fourth partial image. That is, the first device 400-1 may have image quality information of each of the partial images forming the original image 905 corresponding to one frame. The first device 400-1 may obtain one image quality processing information from the first through fourth image quality information based on predetermined reference information. For example, if the predetermined reference information is set to an average value, the first device may obtain the average value of the first through fourth image quality information as image quality processing information. Thereafter, the first device 400-1 may apply the obtained image quality processing information to the first partial image and transmit the same to the first display module 300-1.

The second device 400-2 may also have the image quality information corresponding to each of the first partial image through the fourth partial image as the first device 400-1. The second device 400-2 may obtain one image quality processing information from the first through fourth image quality information based on the predetermined reference information. Here, the predetermined reference information is information set in an equal manner to the first through fourth devices (400-1 through 400-4), and the second device (400-2) may obtain the average value of the first through fourth image quality information as image quality processing information. Thereafter, the second device (400-2) may apply the obtained image quality processing information to the second partial image and transmit the same to the second display module 300-2. Since the image quality processing information obtained by the second device 400-2 is the same as the image quality processing information obtained by the first device 400-1, the image output from the first display module 300-1 and the second display module 300-2 may be output images to which the same image quality processing information is applied.

The third and fourth devices (400-3 and 400-4) perform the operation as described above, and the image output from the display device 300 in which the first through fourth display modules (300-1 through 300-4) are combined may be an image formed of partial images to which the same image quality processing information is applied.

Figure 5:
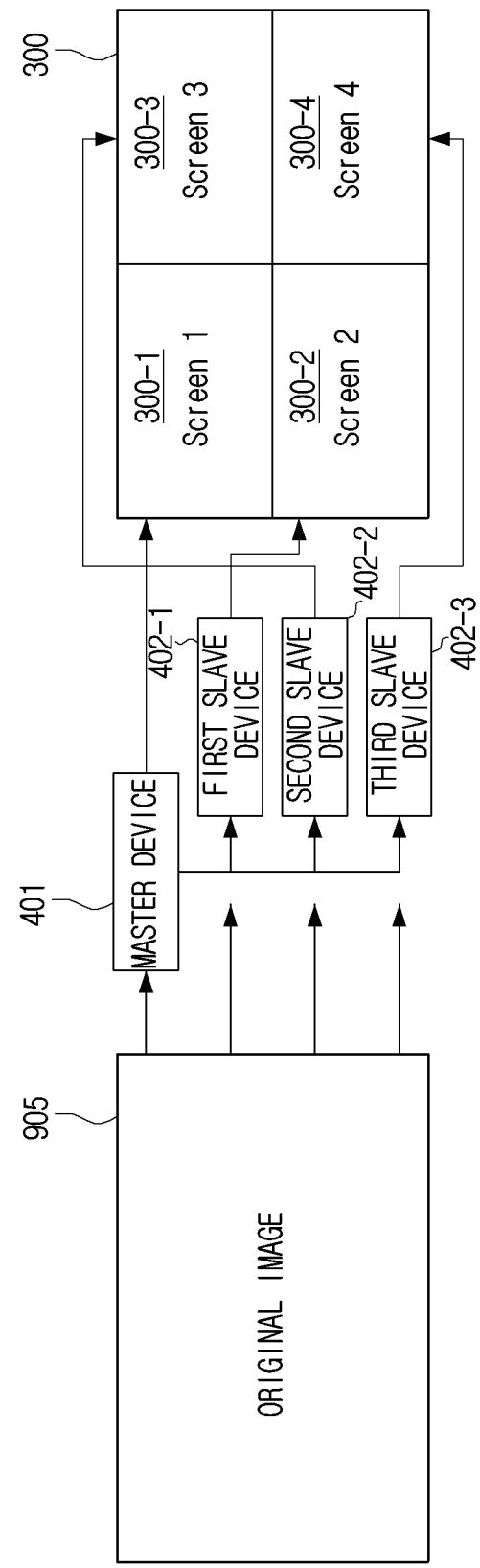
FIG. 5 is a view illustrating an operation of sharing image quality information between devices according to another embodiment.

FIG. 5 is a view illustrating an operation of sharing image quality information between devices according to another embodiment.

As illustrated in FIG. 5, similar to FIG. 4, the display device 300 may be implemented as a device in which the first through fourth display modules (300-1 to 300-4) are combined, four image processing devices are provided that correspond to the first through fourth display modules (300-1 to 300-4), respectively, and the image processing devices each transmit a partial image to a corresponding one of the display modules.

Unlike FIG. 4, one of the first through fourth image processing devices is a master device 401 and the other devices are implemented as slave devices (402-1 through 402-3). Hereinafter, for convenience of description, the first device corresponding to the master device is described as the master device 401, and the second through fourth devices, corresponding to the slave devices, are described as the first slave device through the third slave device (402-1 through 402-3).

The original image 905 corresponding to one frame is decomposed by the input device so that each of the first partial image through the fourth partial image may be transmitted to the master device 401 and the first through third slave devices (402-1 through 402-3). When the first partial image is received, the master device 401 may obtain first image quality information corresponding to the first partial image. When the second partial image is received, the first slave device 402-1 may obtain second image quality information corresponding to the second partial image and transmit the second image quality information to the master device. Similarly, the second slave device 402-2 and the third slave device 402-3 may also transmit third image quality information and fourth image quality information to the master device 401.

If all the image quality information of each partial image forming the original image 905, that is, the second through fourth image quality information, is received, the master device 401 may obtain image quality processing information based on the first through fourth image quality information. For example, if the predetermined reference information is set to an average value, the master device 401 may obtain the average value of the first through fourth image quality information as image quality processing information. The master device 401 may then transmit the obtained image quality processing information to the first through third slave devices (402-1 through 402-3).

Thereafter, the master device 401 may transmit the image quality processing information to the first display module 300-1 by applying the image quality processing information to the first partial image, and the first slave device 402-1 may apply the image quality processing information received from the master device 401 to the second partial image and transmit the image quality processing information to the second display module 300-2. The second slave device 402-2 and the third slave device 402-3 may also apply the received image quality processing information to the third partial image and the fourth partial image and transmit the same to the third display module 300-3 and the fourth display module 300-4, respectively.

That is, the image quality processing information may be calculated only in the master device 401, and the calculated image quality processing information may be transmitted to the slave devices. Therefore, since the same image quality processing information is applied to each partial image forming one whole image, the display device 300 including the plurality of display modules may output an image formed of partial images to which the same image quality processing information is applied.

Figure 6:
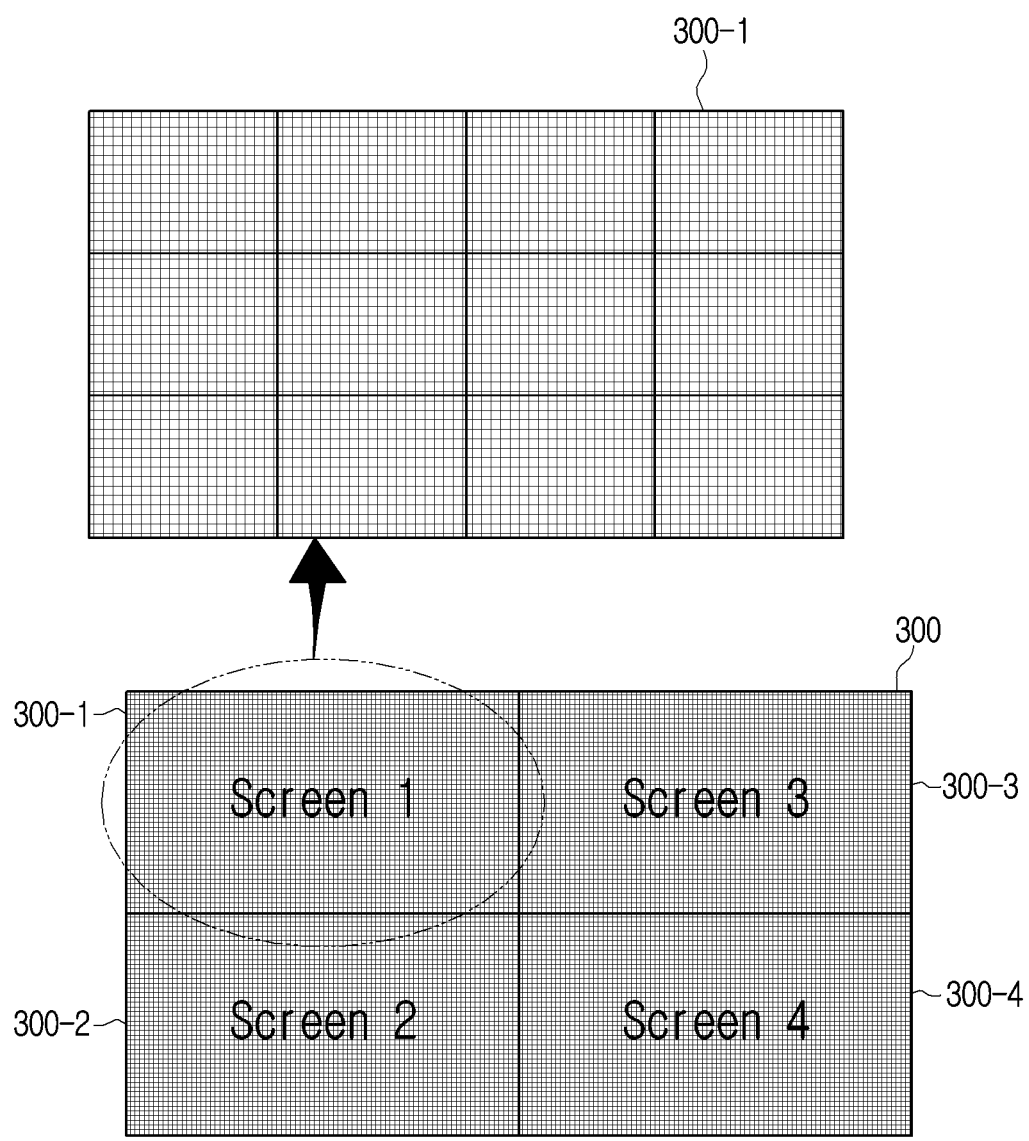
FIG. 6 is a view illustrating a display device including a plurality of display modules according to an embodiment.

FIG. 6 is a view illustrating an example configuration of the display device 300 including a plurality of display modules according to an embodiment.

FIG. 6 illustrates an example of the display device 300 which is implemented as a device in which the first through fourth display modules (300-1 through 300-4) are coupled. Here, each of the display modules (300-1 through 300-4) may correspond to a different image processing device (e.g. electronic device, a plurality of external electronic devices), and receive a partial image to which image quality processing information is applied, from different image processing devices. For example, the display device 300, when configured of 8 kilo pixel (8K) (7,680×4,320), may be implemented by combining the four display modules (300-1 to 300-4) of 4K (4,096×2,160). Here, 8K (7,680×4,320) and 4K (4,096×2,160) are examples of resolution, and are not limited thereto.

Each of the display modules (300-1 through 300-4) may include a plurality of sub-modules. For example, the first display module 300-1 may be composed of a plurality of display sub-modules. That is, a plurality of sub-modules may be combined to form a single display module, and the display modules may be combined to form a single display device. For example, when each of the display modules (300-1 through 300-4) is implemented as a 4K display module, each 4K display module may be composed of a plurality of sub-modules.

The first display module 300-1 including a plurality of display modules may have an interface with a channel bandwidth of sufficient size to receive a high-definition image. Even if the first display module 300-1 does not have an interface with a sufficient channel bandwidth, if the electronic device 100 decomposes a high-definition image and transmits the image to the first display module 300-1, the first display module 300-1 may receive a high-definition image. Therefore, the first display module 300-1 may require the electronic device 100, which is an image processing device for decomposing and transmitting the image.

For the same reason, each of the second through fourth display modules (300-2 through 300-4) may require a respective electronic device (e.g. electronic device 200), that may be individual and external, for receiving a high-definition image. An operation of the electronic device 100 for decomposing and transmitting an image will be described with reference to FIG. 7.

In the example of the display device 300, that may be large and in which the first through fourth display modules 300-1 to 300-4 are coupled, image processing devices (e.g. the electronic device 100 and the other electronic device 200) corresponding to the respective display modules (300-1 through 300-4) can be used together. However, since each of the image processing devices operates independently, different image quality processing information can be applied to each of the display modules 300-1 to 300-4 corresponding to each image processing device. Therefore, by sharing image quality information between image processing devices according to the above-described embodiment, an entire image to which one image quality processing information is applied can be output from the display device 300 in which the first through fourth display modules (300-1 through 300-4) are coupled.

Figure 7:
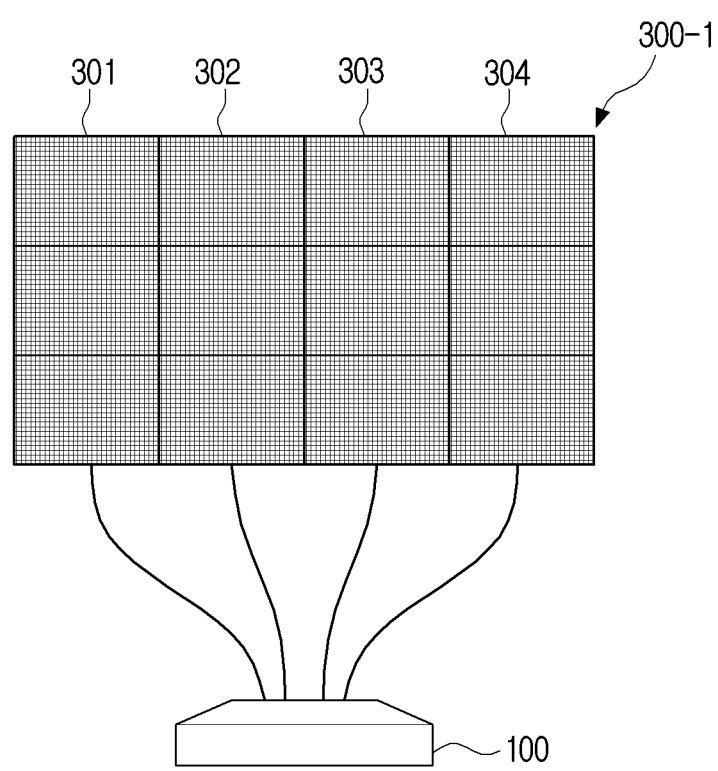
FIG. 7 is a view illustrating an operation of transmitting a decomposed video signal to one of corresponding plurality of display modules according to an embodiment.

FIG. 7 is a view illustrating an operation of transmitting a decomposed video signal to one of corresponding plurality of display modules according to an embodiment.

In FIG. 7, the display module 300-1 represents the first display module 300-1 among the display modules of the display device 300 illustrated in FIG. 6. As described above, the first display module 300-1 may include a plurality of sub-modules. For example, as illustrated in FIG. 7, the first display module 300-1 has a 3×4 sub-module format.

In this case, the electronic device 100 can divide the first display module 300-1 into four column groups 301, 302, 303, and 304, and each group can receive an image from the electronic device 100 through a port. Specifically, the electronic device 100 can divide the first display module 300-1 into a plurality of groups based on a vertical direction based on the number of ports connected to the first display module 300-1.

The electronic device 100 may decompose the first partial image to which image quality information is processed to signals corresponding to each of the plurality of groups. The decomposed signal may be a signal decomposed based on a position and number of each group. For example, the electronic device 100 may transmit each signal of an image which is obtained by vertically dividing the first partial image into four equal parts that each correspond to a respective group.

The bandwidth of the decomposed video signal may correspond to the channel bandwidth of the communication interface 110.

If the bandwidth of the first partial video signal before decomposition is a first channel bandwidth and the channel band width of the communication interface 110 is a second channel bandwidth smaller than the first channel bandwidth, the electronic device 100 may decompose the first partial video signal corresponding to the first channel bandwidth to correspond to the second channel bandwidth.

Although FIG. 7 illustrates only one display module among the plurality of display modules constituting the display device 300, the other display modules may also be associated with one or more electronic devices 200 for decomposing the video signal. With reference to FIG. 6, when the first through fourth display modules (300-1 through 300-4) constitute one display device 300, each of the first through fourth display modules (300-1 through 300-4) may be associated with a respective electronic device (e.g. the electronic device 100 or the external electronic device 200). The four image processing devices may display an image to which one image quality process information is applied by decomposing a partial video signal and transmitting the decomposed video signal by applying the same image quality processing information before transmitting the decomposed video signal to a corresponding group. Accordingly, the user may recognize the image as if the image is processed by one image processing device or output by one display device.

The number of modules described above is only one example and display devices of the present disclosure may have any number of modules and sub-modules. Also, although the electronic device 100 has been described above as grouping the display sub-modules based on a vertical direction, the display sub-modules may be grouped based on a horizontal direction.

Figure 8:
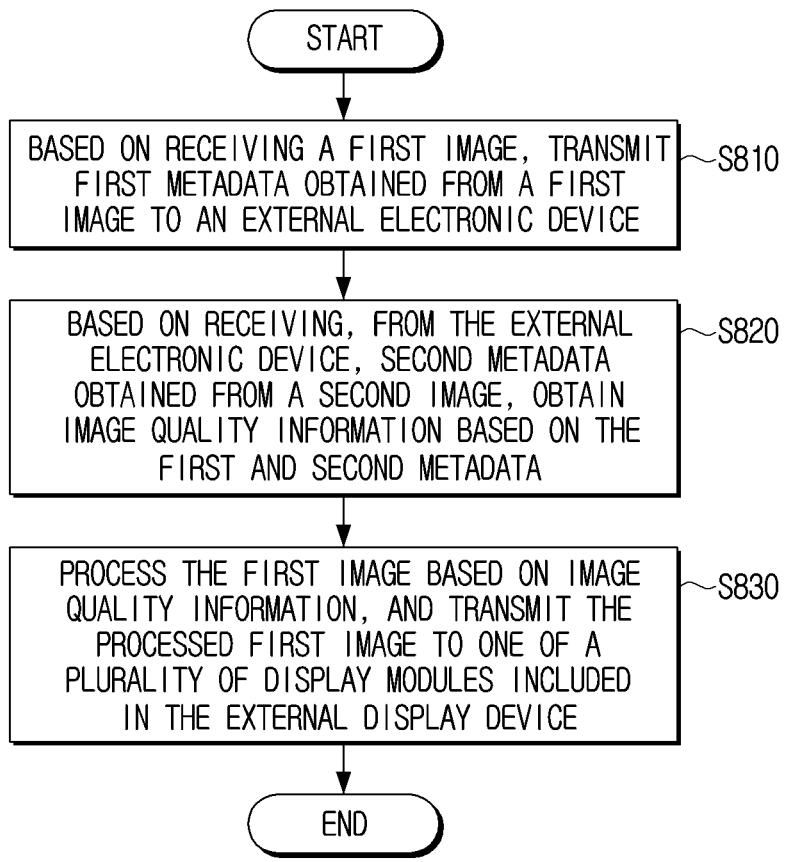
FIG. 8 is a flow chart illustrating a controlling method of an electronic device according to an embodiment.

FIG. 8 is a flow chart illustrating a controlling method of an electronic device according to an embodiment.

The electronic device 100 may provide a first partial image corresponding to one of a plurality of display modules included in the display device 300.

Based on receiving the first partial image, the electronic device 100 may transmit first meta data obtained from the first partial image to an external electronic device (e.g. electronic device 200) in operation S810.

Based on receiving, from the external electronic device (e.g. electronic device 200), second metadata obtained from the second partial image, the electronic device 100 may obtain image quality information based on the first and second metadata in operation S820.

In operation S830, the electronic device 100 may process the first partial image based on the image quality information and transmit the processed first image to one of the plurality of display modules included in the display device.

The electronic device 200 may provide a second partial image to another module of the plurality of display modules of the display device 300.

FIG. 9 is a flow chart illustrating another controlling method of an electronic device according to an embodiment.

In operation S860, the electronic device 100 may obtain first image quality information from a first partial image that is received. In some embodiments, the electronic device 100 may also transmit the first image quality information obtained from the first partial image to an external electronic device (e.g. electronic device 200) in operation S860.

Based on receiving second image quality information obtained from the second partial image from the external electronic device (e.g. electronic device 200), the electronic device 100 may obtain image quality processing information based on the first and second image quality information in operation S870. The image quality processing information may include at least one of luminance information, pixel value information, contrast ratio information, or resolution information.

The electronic device 100 may obtain the image quality processing information based on at least one of a maximum value, a minimum value, or an average value of the first image quality information and the second image quality information.

The electronic device 100 may obtain the image quality processing information based on predetermined reference information. For example, when the predetermined reference information is an average value, the image quality processing information may be obtained as an average value of the first image quality information and the second image quality information.

The predetermined reference information may be information used to obtain image quality processing information based on the first and second image quality information in the electronic device 200. That is, the predetermined reference information may be used by the electronic device 100 and the electronic device 200 in the same manner. The predetermined reference information may be automatically determined according to the type of the user's input or video content.

The electronic device 100 may process the first partial image based on the image quality processing information, and transmit the processed first partial image to one of a plurality of display modules included in the display device 300 in operation S880. The second partial image may also be processed based on the image quality processing information and may be transmitted to another of the plurality of display modules included in the display device 300.

The electronic device 200 may provide the second partial image to the another module of the plurality of display modules of the display device 300.

Each of the first partial image and the second partial image may be a part of an image frame displayed in the display device 300.

Each of the first partial image and the second partial image may be processed based on the image quality information by the electronic device 100 and the electronic device 200, and then provided to the display device 300.

The electronic device 100 may process the current image frame based on the image quality processing information after the current image frame included in the first partial image is received and before the next image frame is received, and transmit the processed current image frame to one of the plurality of display modules of the display device 300.

The first partial image and the second partial image may be provided to each of the electronic device 100 and the electronic device 200 from the image providing device storing an image content including the first partial image and the second partial image.

The methods according to the various embodiments as described above may be implemented as an application format installable in an existing electronic device.

The methods according to the various embodiments as described above may be implemented as a software upgrade or a hardware upgrade for an existing electronic device.

The various embodiments described above may be performed through an embedded server provided in an electronic device, or an external server of at least one electronic device and a display device.

Furthermore, various embodiments of the disclosure may be implemented in software, including instructions stored on machine-readable storage media readable by a machine (e.g., a computer). An apparatus may call instructions from the storage medium, and execute the called instruction, including an electronic apparatus (for example, electronic apparatus A) according to the embodiments herein. When the instructions are executed by a processor, the processor may perform a function corresponding to the instructions directly or by using other components under the control of the processor. The instructions may include code generated by a compiler or code executable by an interpreter. A machine-readable storage medium may be provided in the form of a non-transitory storage medium. Herein, the term "non-transitory" denotes that a storage medium does not include a signal, but is tangible and does not distinguish the case in which data is semi-permanently stored in a storage medium from the case in which data is temporarily stored in a storage medium.

According to an embodiment, the methods according to various embodiments herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

In addition, one or more embodiments described above may be implemented in a computer readable medium, such as a computer or similar device, using software, hardware, or combination thereof. In some cases, the one or more embodiments described herein may be implemented by the processor itself. According to a software implementation, embodiments such as the procedures and functions described herein may be implemented with separate software modules. Each of the software modules may perform one or more of the functions and operations described herein.

According to the embodiments, computer instructions for performing the processing operations of the apparatus may be stored in a non-transitory computer-readable medium. The computer instructions stored in the non-transitory computer-readable medium may cause a particular apparatus to perform the processing operations on the apparatus according to the one or more embodiments described above when executed by the processor of the particular apparatus.

Non-transitory computer readable medium is a medium that semi-permanently stores data and is readable by the apparatus. Examples of non-transitory computer-readable media may include CD, DVD, hard disk, Blu-ray disk, USB, memory card, ROM, or the like.

Each of the elements (for example, a module or a program) according to various embodiments may be composed of a single entity or a plurality of entities, and some sub-elements of the above mentioned sub-elements may be omitted. The elements may be further included in various embodiments. Alternatively or additionally, some elements may be integrated into one entity to perform the same or similar functions performed by each respective element prior to integration. One or more operations performed by a module, program, or other element, in accordance with various embodiments, may be performed sequentially, in a parallel, repetitive, or heuristically manner, or at least some operations may be performed in a different order.

While the disclosure has been shown and described with reference to various embodiments, it will be understood by those skilled in the art that various changes in form and details may be made therein without departing from the spirit and scope of the disclosure as defined by the appended claims and their equivalents.

What is claimed is:

1. An electronic device comprising:
    a communication interface comprising communication circuitry; and
    a processor configured to:
        based on receiving a first partial image from among a plurality of partial images obtained by an input device by dividing an image, obtain first image quality information based on the first partial image and transmit the first image quality information to an external electronic device,
        based on receiving, from the external electronic device, second image quality information obtained from a second partial image among the plurality of the partial images, obtain image quality processing information corresponding to the image based on the first image quality information and the second image quality information, and
        process the first partial image based on the image quality processing information, and transmit, via the communication interface, the first partial image processed to one of a plurality of display modules included in an external display device,
    wherein the external electronic device is configured to provide the second partial image processed based on the image quality processing information to another module among the plurality of display modules, and
    wherein the external display device is configured to display a processed image corresponding to the image by displaying each of the first partial image processed by the electronic device and the second partial image processed by the external electronic device.

2. The electronic device of claim 1, wherein
    the electronic device is a master device and the external electronic device is a slave device, and
    the processor is further configured to control the communication interface to transmit the image quality processing information to the external electronic device.

3. The electronic device of claim 1, wherein each of the first partial image and the second partial image is provided to the external display device after being processed based on the image quality processing information by the electronic device and the external electronic device, respectively.

4. The electronic device of claim 3, wherein
    the processor is further configured to obtain the image quality processing information based on predetermined reference information.

5. The electronic device of claim 1, wherein the processor is further configured to obtain the image quality processing information based on at least one of a maximum value, a minimum value, or an average value of the first image quality information and the second image quality information.

6. The electronic device of claim 1, wherein the image quality processing information comprises at least one from among luminance information, pixel value information, contrast ratio information, and resolution information.

7. The electronic device of claim 1, wherein the first partial image and the second partial image are configured to be provided to the electronic device and the external electronic device, respectively, from an image providing device storing an image content including the first partial image and the second partial image.

8. The electronic device of claim 1, wherein
    the first partial image and the second partial image have a 4 kilo pixel (K) resolution, and
    each of the plurality of display modules has the 4K resolution.

9. An electronic system comprising:
    a display device comprising a first display module, a second display module, a third display module, and a fourth display module;
    a first electronic device configured to:
        based on receiving a first partial image from among a plurality of partial images obtained by an input device by dividing an image, obtain first image quality information based on the first partial image and transmit the first image quality information to a second electronic device, a third electronic device, and a fourth electronic device, based on receiving second image quality information obtained from a second partial image, from among the plurality of partial images, from the second electronic device, receiving third image quality information obtained from a third partial image, from among the plurality of partial images, from the third electronic device, and receiving fourth image quality information obtained from a fourth partial image, from among the plurality of partial images, from the fourth electronic device,
        obtain image quality processing information corresponding to the image based on the first through fourth image quality information, and
        process the first partial image based on the image quality processing information, and transmit the first partial image processed to the first display module of the display device;
    the second electronic device, the second electronic device configured to obtain the image quality processing information based on the first through fourth image quality information, and transmit the second partial image processed based on the image quality processing information to the second display module;
    the third electronic device, the third electronic device configured to obtain the image quality processing information based on the first through fourth image quality information, and transmit the third partial image processed based on the image quality processing information to the third display module; and
    the fourth electronic device, the fourth electronic device configured to obtain the image quality processing information based on the first through fourth image quality information, and transmit the fourth partial image processed based on the image quality processing information to the fourth display module,
    wherein the display device is configured to display a processed image corresponding to the image by displaying each of the first partial image, the second partial image, the third partial image, and the fourth partial image processed by the first through fourth electronic device.

10. The electronic system of claim 9, wherein the first through fourth partial images have a 4 kilo pixel (4K) resolution, and
wherein each of the first through fourth display modules has the 4K resolution.

11. A method for controlling a system including an electronic device, the method comprising:
based on receiving a first partial image from among a plurality of partial images obtained by an input device by dividing an image, obtaining first image quality information based on the first partial image and transmitting the first image quality information to an external electronic device;
based on receiving, from the external electronic device, second image quality information obtained from a second partial image from among the plurality of partial images, obtaining image quality processing information corresponding to the image based on the first image quality information and the second image quality information; and
processing the first partial image based on the image quality processing information and transmitting the first partial image processed to one of a plurality of display modules of a display device,
wherein the external electronic device is configured to provide the second partial image processed based on the image quality processing information to another module among the plurality of display modules of the display device, and
wherein the display device is configured to display a processed image corresponding to the image by displaying each of the first partial image processed by the electronic device and the second partial image processed by the external electronic device.

12. The method of claim 11, wherein the electronic device is a master device and the external electronic device is a slave device, and the method further comprising:
transmitting the image quality processing information to the external electronic device.

13. The method of claim 12, wherein
the obtaining the image quality processing information comprises obtaining, by the electronic device, the image quality processing information based on predetermined reference information, and
the method further comprises obtaining the image quality processing information by the external electronic device, based on the first image quality information and the second image quality information,
wherein the predetermined reference information is used for obtaining the image quality processing information based on the first and second image quality information by the external electronic device.

14. The method of claim 11, further comprising:
transmitting, via the external electronic device, the second partial image to the display device,
wherein each of the first partial image and the second partial image is provided to the display device after being processed based on the image quality processing information by the electronic device and the external electronic device, respectively.

15. The method of claim 11, wherein the obtaining the image quality processing information comprises obtaining the image quality processing information based on at least one of a maximum value, a minimum value, or an average value of the first image quality information and the second image quality information.

16. The method of claim 11, wherein
the first partial image and the second partial image have a 4 kilo pixel (4K) resolution, and
each of the plurality of display modules has the 4K resolution.

* * * * *